US012734547B2

(12) United States Patent
Saito et al.

(10) Patent No.: US 12,734,547 B2
(45) Date of Patent: Sep. 15, 2026

(54) DISPENSING APPARATUS, MOVABLE MEMBER, CIRCULATION CONTROL METHOD

(71) Applicant: THREEBOND CO., LTD., Tokyo (JP)

(72) Inventors: Naoya Saito, Tokyo (JP); Takuma Kado, Tokyo (JP)

(73) Assignee: THREEBOND CO., LTD., Tokyo (JP)

( * ) Notice: Subject to any disclaimer, the term of this patent is extended or adjusted under 35 U.S.C. 154(b) by 220 days.

(21) Appl. No.: 17/754,197

(22) PCT Filed: Sep. 18, 2020

(86) PCT No.: PCT/JP2020/035582
§ 371 (c)(1),
(2) Date: Mar. 25, 2022

(87) PCT Pub. No.: WO2021/070602
PCT Pub. Date: Apr. 15, 2021

(65) Prior Publication Data

US 2022/0323985 A1 Oct. 13, 2022

(30) Foreign Application Priority Data

Oct. 7, 2019 (JP) ................................ 2019-184532

(51) Int. Cl.
*B05C 11/10* (2006.01)
*B05C 5/02* (2006.01)

(52) U.S. Cl.
CPC ........ *B05C 11/1031* (2013.01); *B05C 5/0229* (2013.01)

(58) Field of Classification Search
CPC ............. B05C 11/1047; B05C 11/1031; B05C 5/0229; B05C 5/0225
See application file for complete search history.

(56) References Cited

U.S. PATENT DOCUMENTS

| | | | | |
|---|---|---|---|---|
| 1,925,109 A * | 9/1933 | Olson | B23B 31/16216 137/625.48 |
| 2,140,735 A * | 12/1938 | Clarke | F16N 39/00 184/104.1 |

(Continued)

FOREIGN PATENT DOCUMENTS

| | | | |
|---|---|---|---|
| CN | 201342393 Y | 11/2009 | |
| CN | 206373025 U | 8/2017 | |
| DE | 19945537 C1 * | 8/2000 | B05B 13/0431 |

OTHER PUBLICATIONS

Extended European Search Report dated Nov. 10, 2023 for the corresponding European Patent Application No. 20873655.3.

(Continued)

*Primary Examiner* — Paul R Durand
*Assistant Examiner* — Randall A Gruby
(74) *Attorney, Agent, or Firm* — LUCAS & MERCANTI, LLP

(57) ABSTRACT

A dispensing apparatus includes: a storage unit including a first flow path, a second flow path, and a third flow path; and a movable member including a first part, and a second part. The first part and the second part are formed in a long shape, and the second part is formed such that a cross-section crossing the longitudinal direction is smaller than that of the first part.

6 Claims, 6 Drawing Sheets

(56) References Cited

U.S. PATENT DOCUMENTS 2,633,324 A * 3/1953 Bierman ................. F16K 11/07 137/625.48
2,764,181 A * 9/1956 Richolt ............... F16K 11/0712 137/625.42
3,145,723 A * 8/1964 Chorkey ............... F16K 17/164 137/493.2
3,474,828 A * 10/1969 Ward ...................... F16K 31/12 137/625.6
3,618,628 A * 11/1971 Kramer ................. F16K 31/363 137/71
3,797,525 A * 3/1974 Lieser ................. F16K 11/0716 137/625.6
3,951,166 A * 4/1976 Whitener ............ F16K 31/0686 137/625.69
3,979,908 A * 9/1976 Alderson .............. F15B 13/022 137/101
3,993,099 A * 11/1976 Nightingale .......... F16K 11/065 251/324
4,200,207 A * 4/1980 Akers ..................... F04C 14/26 417/253
4,263,938 A * 4/1981 Peters ................. F16K 37/0066 137/557
4,459,029 A * 7/1984 Veyriere ................. B05C 11/10 366/181.8
4,579,255 A * 4/1986 Frates ................... B05C 5/0225 222/149
4,877,057 A * 10/1989 Christensen ........ F16K 11/0708 137/625.48
4,957,572 A * 9/1990 Dewitte ................ E06B 3/6733 118/302
5,247,966 A * 9/1993 Stevens ............... F16K 11/0712 137/625.48
5,447,494 A * 9/1995 Dorsey, III ............. A61M 1/85 604/38
5,458,684 A * 10/1995 Miller ................... B05B 1/3093 118/313
5,466,216 A * 11/1995 Brown ................ A61M 1/3613 604/249
5,620,426 A * 4/1997 Braithwaite .......... A61M 39/18 604/323
5,824,156 A * 10/1998 Watanabe ........... B05C 11/1047 118/410
6,082,629 A * 7/2000 Lee ......................... F16K 23/00 137/467.5
6,092,691 A * 7/2000 Schuerholz ............. B05C 11/10 222/146.2
6,736,291 B1 * 5/2004 Mimura .................. B41F 15/42 222/145.5
7,131,555 B2 * 11/2006 Maruyama .......... B05C 11/1047 417/205
8,028,651 B2 * 10/2011 Rademacher ....... B05C 11/1047 118/321
9,889,463 B2 * 2/2018 Ikushima ............ B05C 11/1034
10,065,161 B2 * 9/2018 Kim ........................ B01F 29/15
10,487,951 B2 * 11/2019 Patterson ............ F16K 31/1221
10,670,155 B2 * 6/2020 Patterson .............. F16K 31/122
11,059,069 B2 * 7/2021 Ikushima ............. B41J 2/04588
11,344,903 B2 * 5/2022 Ikushima .............. B05B 9/0413
11,446,696 B2 * 9/2022 Suzuki ...................... B05C 5/02
12,083,550 B2 * 9/2024 Levins .................. B05C 5/0225
2007/0113906 A1 * 5/2007 Sturman ................. H01F 5/003 137/625.65
2017/0037984 A1 * 2/2017 Frippiat ................ F16K 31/426
2017/0097100 A1 * 4/2017 Patterson .............. F16K 11/048
2017/0211710 A1 * 7/2017 Patterson ............ F16K 11/0716
2019/0358664 A1 * 11/2019 Ikushima ............. B41J 2/04588
2022/0323985 A1 * 10/2022 Saito ..................... B05C 5/0229
2023/0026919 A1 * 1/2023 Uchino ................. B05C 5/0216
2025/0303433 A1 * 10/2025 Losiewicz ............ B05C 5/0225

OTHER PUBLICATIONS

Office Action dated Sep. 6, 2023 for the corresponding Chinese Patent Application No. 202080069763.5, with English translation.
Office Action dated Feb. 15, 2023 for the corresponding Chinese Patent Application No. 202080069763.5, with English translation.
Chinese Patent Office, “Rejection Decision” dated Jan. 29, 2024, which was issued for the corresponding Chinese Patent Application No. 202080069763.5 and its English translation, 12 pages.
Request for the Submission of an Opinion dated Nov. 22, 2024, issued for the corresponding Korean Patent Application No. 10-2022-7008199, 10 pages, with English translation.

* cited by examiner

DISPENSING APPARATUS, MOVABLE MEMBER, CIRCULATION CONTROL METHOD

CROSS REFERENCE TO RELATED APPLICATION

This Application is a 371 of PCT/JP2020/035582 filed on Sep. 18, 2020 which, in turn, claimed the priority of Japanese Patent Application No. 2019-184532 filed on Oct. 7, 2019, both applications are incorporated herein by reference.

TECHNICAL FIELD

The present invention relates to a dispensing apparatus, a movable member, and a circulation control method.

BACKGROUND ART

Conventionally, there has been known an apparatus that dispenses a material, such as a sealing agent and an adhesive, composed of low-viscosity or high-viscosity fluid, such as a silicone resin, and an epoxy resin. In the material dispensing apparatus above, switching between dispensing and not dispensing the material is controlled by a movable valve in the apparatus. Patent Literature 1 discloses a technique for switching circulation of a fluid with a needle valve disposed immediately above a nozzle.

CITATION LIST

Patent Literature

Patent Literature 1: Japanese Translation of PCT International Application Publication No. 1990-500961

SUMMARY OF INVENTION

According to Patent Literature 1, the needle valve is inserted into a liquid chamber, and a valve seat is disposed at a position facing the needle valve. With the needle valve as described above, a volume change may occur in the valve at the opening timing and closing timing of the needle valve. Thus, when the valve is closed, the volume amount of an adhesive or the like flows out to the dispensing side, and causes a liquid pool. If a liquid pool occurs, it is likely difficult to conduct a precise application.

Therefore, the purpose of the present invention is to provide a dispensing apparatus and a circulation control method capable of reducing or inhibiting a liquid pool of a material by providing a new valve mechanism immediately above a nozzle.

A dispensing apparatus according to an aspect of the present invention that solves the above-mentioned problem includes a first storage unit, and a movable member. The first storage unit includes: a first flow path that is capable of circulating a material, and extends in a first direction; a second flow path that extends in a second direction crossing the first direction, and communicates with the first flow path; and a third flow path that is provided parallel to the first direction, circulates with the second flow path, and has an axis spaced apart from an axis of the first flow path. The movable member includes a first part, and a second part. The movable member is disposed so as to be movable in the second direction in the second flow path. The first part is configured such that, when positioned on an extended line, the first part is capable of closing at least one of a first opening allowing the first flow path to be in communication with the second flow path, and a second opening allowing the second flow path to be in communication with the third flow path. The second part is provided continuously with the first part, and, when positioned on the extended line, allows the first flow path to be in communication with the second flow path, and also allows the second flow path to be in communication the third flow path. Moreover, an aspect of the present invention is a movable member including the first part and the second part. Furthermore, an aspect of the present invention is a method for controlling circulation of a material with the use of the above-described dispensing apparatus.

DESCRIPTION OF EMBODIMENTS

Figure 1:
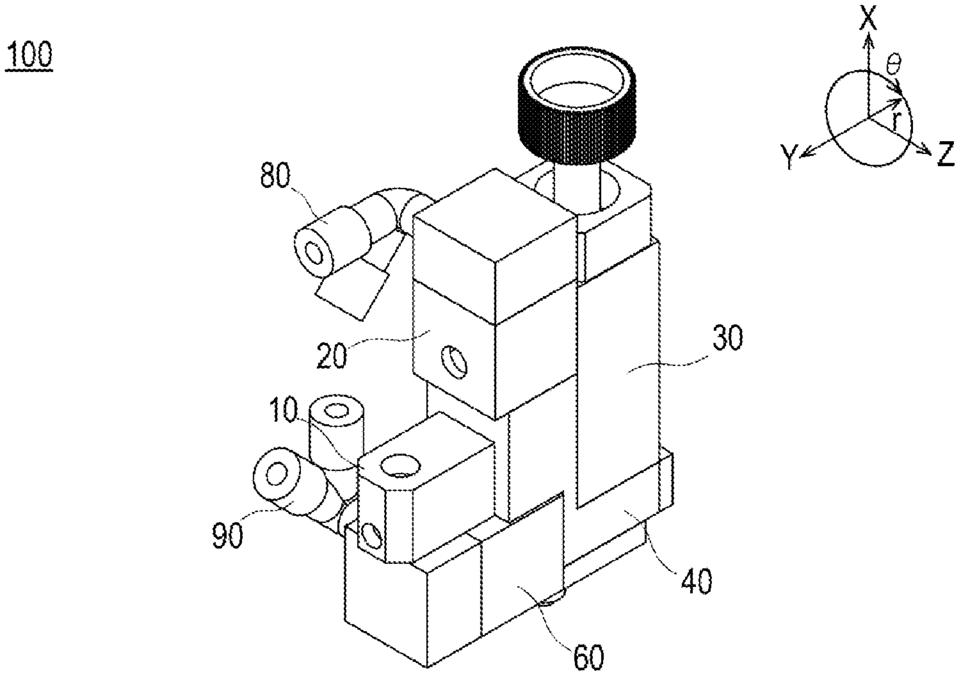
FIG. 1 is a perspective view showing a dispensing apparatus according to an embodiment of the present invention.

Hereinafter, an embodiment of the present invention will be described with reference to the attached drawings. Note that the following description does not intend to limit the technical scope and the meaning of terms described within the scope of patent claims. Moreover, the dimensional ratios in the drawings are exaggerated for convenience of explanation, and may differ from the actual ratios.

Figure 2:
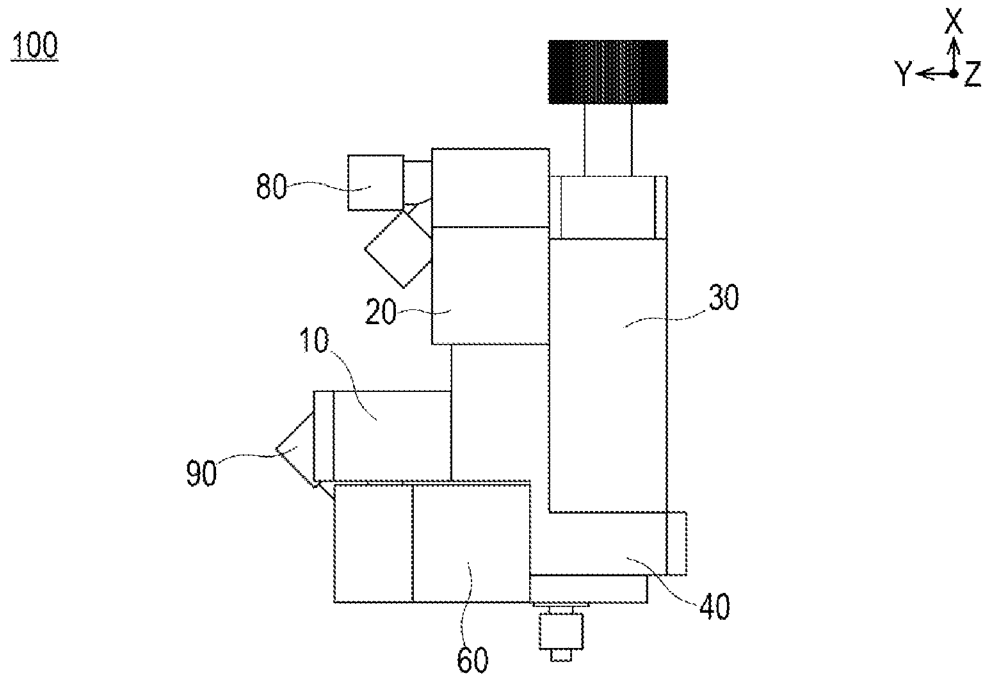
FIG. 2 is a front view of FIG. 1.
Figure 4:
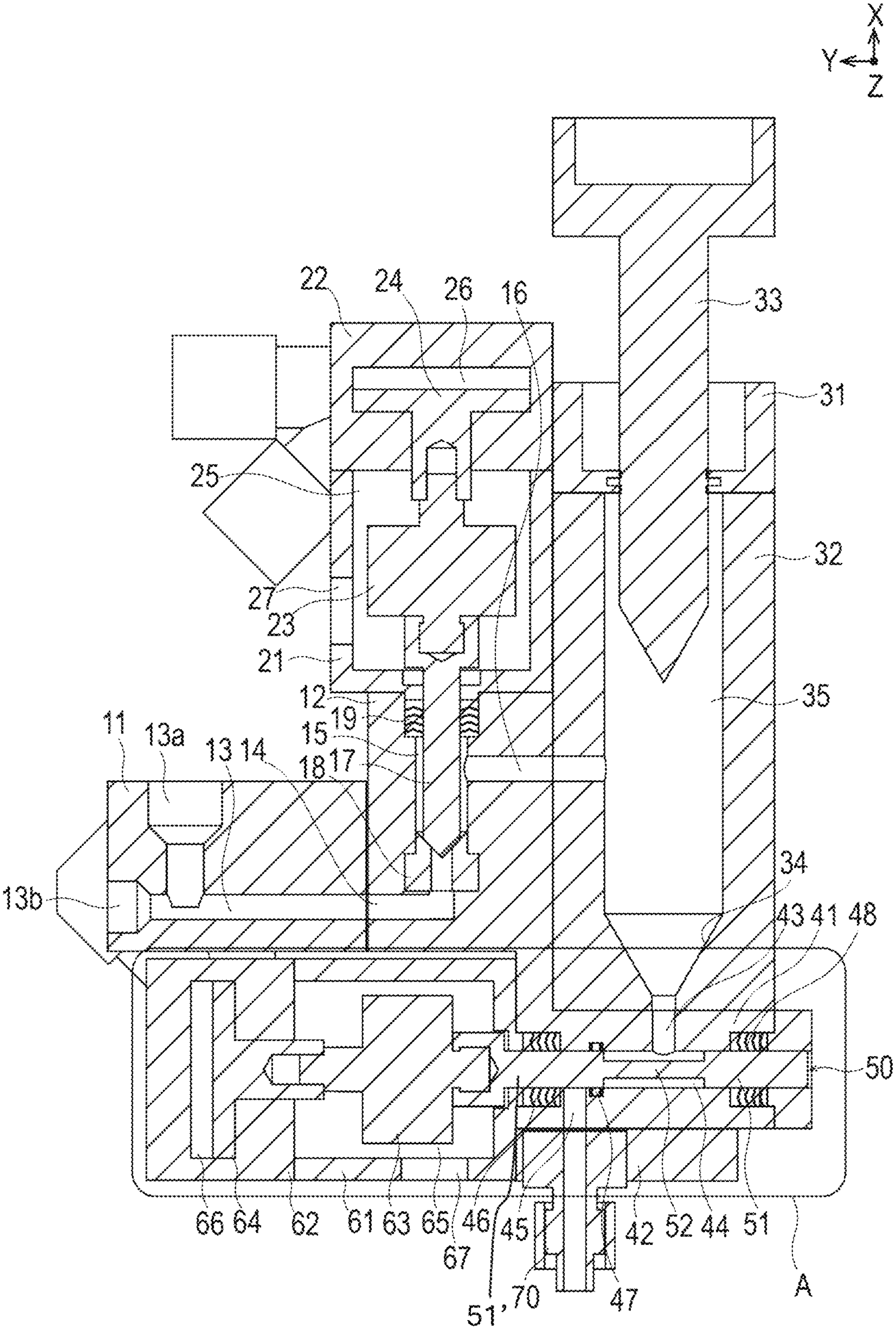
FIG. 4 is a cross-sectional view taken along the 4-4 line of FIG. 3.

A dispensing apparatus 100 according to the present embodiment can be used when dispensing a fixed amount of a one-component material, such as a CIPG (Cured-In-Place Gasket). As shown in FIGS. 2 and 4, the dispensing apparatus 100 includes storage units 10, 20, 30, 40, 60, a movable member 50, a dispensing part 70, and valves 80, 90. Here, the storage unit 40 corresponds to a first storage unit, the storage unit 60 corresponds to a second storage unit, the storage unit 30 corresponds to a third storage unit, and the storage unit 10 corresponds to a fourth storage unit. Furthermore, although the "material" in the present embodiment is not particularly limited, examples include silicone resins, (meth)acrylate resins, epoxy resins, and urethane resins, and it is possible to employ thermal curing, moisture curing, photo-curing, dry curing and the like as curing types. Detailed descriptions will be given below.

(Storage Unit 10)

As shown in FIG. 4, the storage unit 10 includes an inlet member 11, an installation member 12, flow paths 13 to 16 (corresponding to a fifth flow path), a needle valve 17, a valve seat 18, and a packing 19. The installation member 12 of the storage unit 10 is disposed adjacent to a reservoir member 32 of the storage unit 30.

The inlet member 11 forms a section where the flow path 13 in an inlet portion for supplying a material is provided.

An upstream side of the flow path 13 is branched into inlets 13*a*, 13*b* as shown in FIG. 4, and can be used as a section for circulating the material from the inlet 13*a*, performing a first dispensation from the dispensing apparatus 100 through the inlet 13*b*, and exchanging the material. The flow path 13 is formed in a straight line in the present embodiment, but the shape of the flow path is not limited to the straight line, and may be a curved line or other shape as long as the flow path 13 can efficiently circulate a fluid.

The installation member 12 is installed adjacent to the inlet member 11. The installation member 12 is provided with the flow paths 14, 15, 16. The flow path 14 is configured to communicate with the flow path 13 in a state in which the inlet member 11 is coupled to the installation member 12. The flow path 15 communicates with the flow path 14, and is formed by bending an end of the flow path 14 approximately 90 degrees or so. In the flow path 15, the needle valve 17 is movably set, and the valve seat 18 is installed. The flow path 16 communicates with the flow path 15, and is configured to cross the flow path 15. The flow paths 13 to 16 are provided upstream of a storage space 35 of the storage unit 30. Note that the portion constituting the flow paths 13 to 16 of the storage unit 10 may be constituted by a combined member of the inlet member 11 and the installation member 12.

The needle valve 17 is configured in a long shape and is configured with a tip being sharpened acutely. The needle valve 17 is installed so as to be movable in a reciprocating manner in the flow path 15. The tip of the needle valve 17 is configured to be seated on the valve seat 18, thereby capable of blocking the material circulated from the flow path 14 at the flow path 15.

The valve seat 18 is installed on the upstream side relative to the needle valve 17 in the flow path 15. The valve seat 18 has a sloping valve seat surface that makes surface contact with (abuts) the tip of the needle valve 17, thereby configured to be capable of blocking the material circulated from the flow path 14. For the valve seat 18, it is possible to use a material such as plastic and metal, particularly preferably such as plastic containing glass particles.

Figure 3:
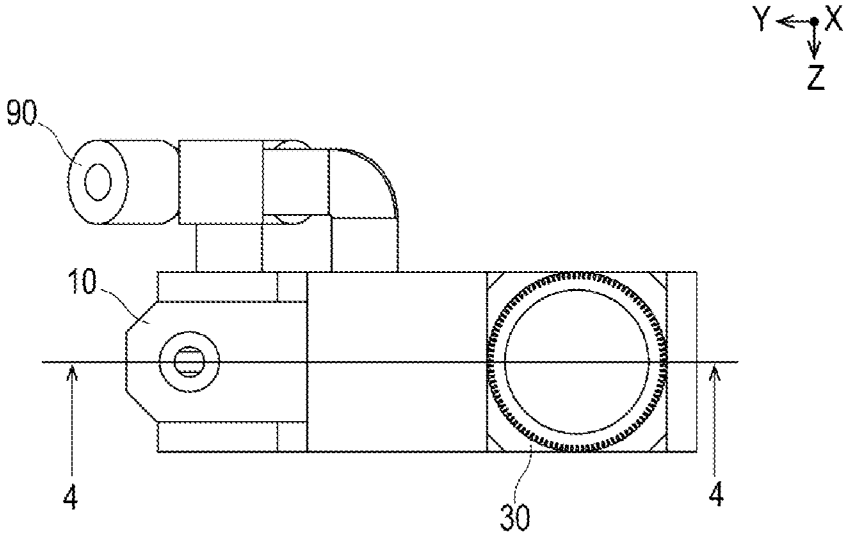
FIG. 3 is a plan view of FIG. 1.

The packing 19 is provided (for a sealing purpose) to prevent communication of the material circulated from the flow paths 13, 14 with a later-described space 25 of the storage unit 20. The packing 19 includes at least one V-shaped bent portion along an axial direction in a cross-section along the axial direction (first direction X) as shown in FIG. 3 in the present embodiment, and it is particularly preferable to arrange three or more V-shaped bent portions.

(Storage Unit 20)

As shown in FIG. 4, the storage unit 20 includes a first member 21, a second member 22, a connection member 23, and a pusher 24.

The first member 21 includes the space 25 in which the connection member 23 which is connected to the needle valve 17 is movable. The second member 22 is disposed adjacent to the first member 21, and includes a space 26 in which the pusher 24 for applying a propulsive force to the connection member 23 is movable, and a hole 27 for circulating the air and discharging a leaked liquid agent. Note that the first member 21 and the second member 22 may be configured with both combined into a single component as long as it is possible to prepare the space 25 in which the connection member 23 is movable, and the space 26 in which the pusher 24 is movable.

As shown in FIG. 4, the connection member 23 includes a coupling part that can be coupled to the needle valve 17, and a coupling part that can be coupled to the pusher 24. The connection member 23 is configured as a columnar body, such as a hexagonal column and a cylindrical column, in the present embodiment. Note that the specific shape is not limited to the columnar body as long as it is possible to apply the propulsive force for moving the needle valve 17 in the longitudinal direction (first direction X).

The pusher 24 applies, through the connection member 23, the propulsive force for moving the needle valve 17 in the longitudinal direction (first direction X). Like the connection member 23, in the present embodiment, the pusher 24 is configured as a columnar body, such as a hexagonal column and a cylindrical column. Note that the specific shape is not limited to the columnar body as long as it is possible to move the needle valve 17 in the longitudinal direction (first direction X) through the connection member 23. As one example, the storage unit 20 can be configured like an air piston.

(Storage Unit 30)

As shown in FIG. 4, the storage unit 30 includes a closing member 31, the reservoir member 32, a plunger 33, and a sloping part 34. The storage unit 30 is disposed adjacent to the storage unit 40.

The closing member 31 is disposed adjacent to the reservoir member 32, and is configured to close the material storage space 35 which is formed by the reservoir member 32. The closing member 31 has a hole in which the plunger 33 is slidable, and it is possible to provide a seal member for liquid tightly sealing the storage space 35 in the hole.

The reservoir member 32 is disposed adjacent to the closing member 31, and includes the storage space 35 (corresponding to the fourth flow path) that can circulate and store the material circulated from the flow path 16. The storage space 35 is located on the upstream side relative to a first flow path 43 of the storage unit 40. The storage space 35 is configured to have a long shape along a moving direction (first direction X) of the plunger 33, and a substantially circular cross-section crossing the longitudinal direction. The sloping part 34 is provided on the lower side of the storage space 35, that is, downstream of the storage space 35. The sloping part 34 is configured to have a substantially truncated cone-shaped sloping surface in accordance with the shape of a tip of the plunger 33. Moreover, a pressure sensor for detecting the pressure in the storage space 35 may be installed in the reservoir member 32.

The plunger 33 is configured to slide in the hole of the closing member 31, and be able to move the tip in a reciprocating manner in the storage space 35. The plunger 33 is configured to move in a reciprocating manner in the storage space 35, and thereby capable of pushing the material stored in the storage space 35 toward the first flow path 43. Furthermore, it is possible to provide a bearing, such as a floating joint, on a proximal end of the plunger 33, and connect this to a ball screw or an electric motor (not shown).

(Storage Unit 40)

As shown in FIG. 4, the storage unit 40 includes a formation member 41, an attachment member 42, the first flow path 43, a second flow path 44, a third flow path 45, and packings 46, 47, 48. Here, the packing 46 corresponds to a first seal member, and the packing 47 corresponds to a second seal member.

In the formation member 41, the first flow path 43, the second flow path 44, and the third flow path 45 are provided. The attachment member 42 is installed adjacent to the formation member 41, and is provided with a section where the dispensing part 70 is attached. Note that the first member and the second member may be configured together by a single component as long as it is possible to provide the first flow path, the second flow path, and the third flow path, and attach the dispensing part. Moreover, in the present embodiment, the formation member 41 is configured integrally with the installation member 12 of the storage unit 10.

The first flow path 43 is located upstream of the second flow path 44 and the third flow path 45. The first flow path 43 allows the material to flow through and is configured to extend in the first direction X. The first flow path 43 is configured to communicate with the storage space 35 of the storage unit 30. In the present embodiment, the first flow path 43 is configured to have a substantially circular cross-section crossing the circulation direction.

The second flow path 44 is configured to extend in a second direction Y crossing the first direction X in which the first flow path 43 extends, and to communicate with the first flow path 43. In the second flow path 44, the later-described movable member 50 is movably disposed. Moreover, sections where the packings 46, 48 can be installed are provided at ends of the second flow path 44 in the circulation direction (second direction Y). Further, a section where the packing 47 can be installed is provided at an intermediate portion of the second flow path 44 in the circulation direction. Note that, instead of the configuration shown in FIG. 4, the formation member 41 may be configured divided in the left-right direction in FIG. 4, at the section where the packing 47 is installed.

The third flow path 45 is configured to extend parallel to the first direction X as well as to communicate with the second flow path 44. The third flow path 45 is provided such that the axis thereof is spaced apart from that of the first flow path 43.

The packing 46 is installed in the second flow path 44. The packing 46 seals in such a manner as to separate the second flow path 44 and a space 65 of the storage unit 60 in a state in which a connection member 63 of the storage unit 60 is connected to the movable member 50. The packing 47 is installed in the second flow path 44, at the boundary between the first part 51 and the second part 52 in the longitudinal direction (second direction Y), when a first part 51 of the movable member 50 closes at least one of a first opening 49*a* and a second opening 49*b* in the second flow path 44. The packing 48 seals so as to prevent communication between a portion where the material circulates at the second flow path 44 and other portions at second flow path 44. Each of the packings 46, 47, 48 includes at least one V-shaped bent portion in a cross-section as shown in FIG. 4 and the like, and it is particularly preferable to arrange three or more V-shaped bent portions.

(Movable Member 50)

As shown in FIG. 4, the movable member 50 includes the first part 51, and the second part 52. The movable member 50 is configured to have a long shape by including the first part 51 and the second part 52. The movable member 50 is configured such that the second direction Y corresponding to the longitudinal direction is parallel to a horizontal direction in a state in which the dispensing apparatus 100 is installed.

Figure 5:
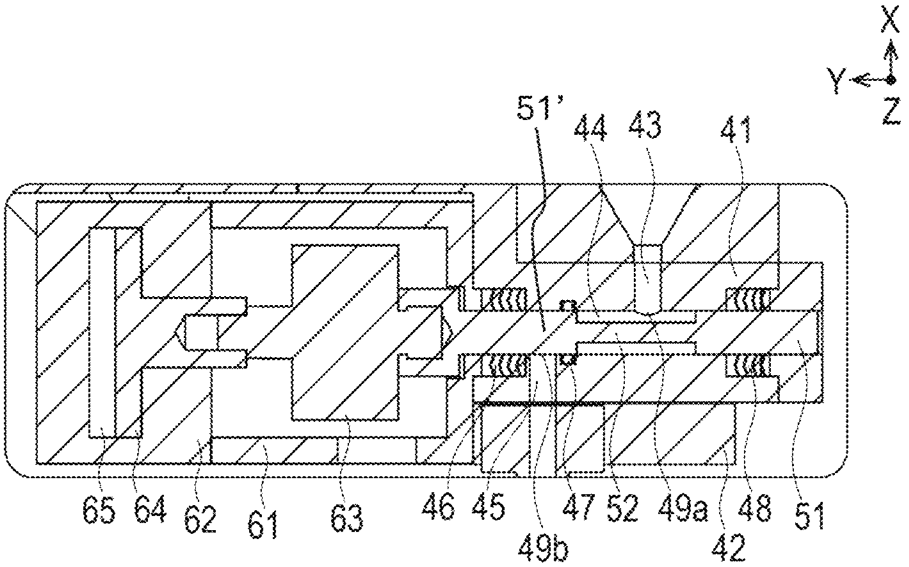
FIG. 5 is a detailed view of the A portion of FIG. 4, and is a view that shows a state in which a second opening is closed with a first part of a movable member.
Figure 6:
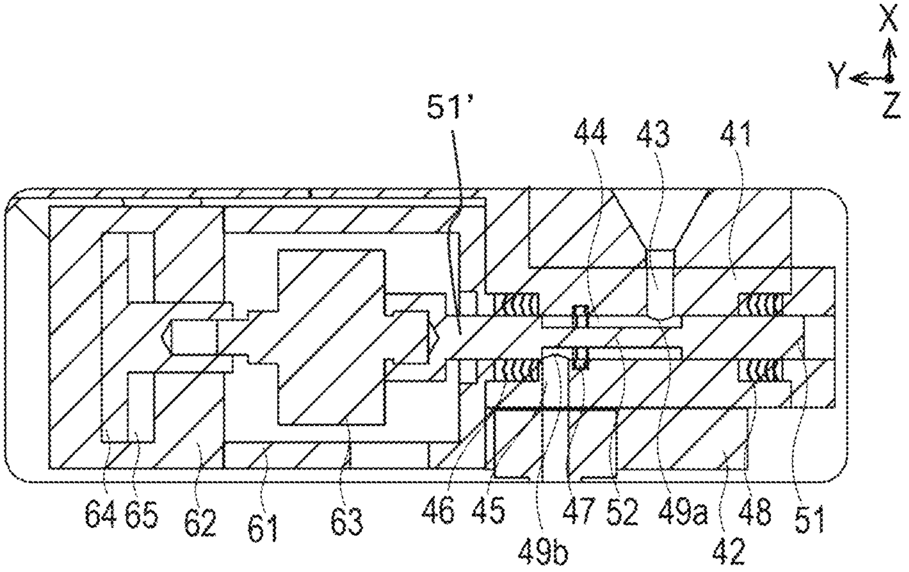
FIG. 6 is a detailed view of the A portion of FIG. 4, and is a view that shows a state in which a second part of the movable member faces a first opening and the second opening.

The first part 51 is disposed so as to be movable in the second direction Y in the second flow path 44. The first part 51 is configured to close at least one of the first opening 49*a* through which the first flow path 43 communicates with the second flow path 44, and the second opening 49*b* through which the second flow path 44 communicates with the third flow path 45, when the first part 51 is positioned on an extended line of the first flow path 43 or the second flow path 44. In the present embodiment, as shown in FIGS. 5 and 6, the first part 51 is configured to close the second opening 49*b* by sliding in the second direction Y, which is different from the first direction X in which the second opening 49*b* faces. In this state, a flow of the material circulated from the storage space 35 can be blocked.

The second part 52 is provided continuously with the first part 51. The second part 52 allows the first flow path 43 and the second flow path 44 to be in communication with each other, and also allows the second flow path 44 and the third flow path 45 to be in communication with each other, when the second part 52 is positioned on the extended lines of the first flow path 43 and the third flow path 45. The second part 52 is configured such that a cross-section thereof crossing the second direction Y corresponding to the longitudinal direction is smaller than that of the first part 51. In the present embodiment, the second part 52 is configured in a rod shape or a cylindrical shape.

In the present embodiment, the movable member 50 is operated in connection with an operation of the plunger 33 by a processor such as a CPU, and memory such as ROM and RAM provided in the dispensing apparatus. As one example, the movable member 50 can be configured to allow the second flow path 44 to be in communication with the first flow path 43 and the third flow path 45 after the internal pressure in the storage space 35 is caused to reach a specified value (predetermined value) by the plunger 33. Moreover, it is possible to operate the movable member 50 so as to allow the second flow path 44 to be in communication with the first flow path 43 and the third flow path 45 simultaneously with the reciprocating movement of the plunger 33. Furthermore, the movable member 50 can be configured to contain stainless steel, such as SUS.

(Storage Unit 60)

As shown in FIG. 4, the storage unit 60 includes a first member 61, a second member 62, the connection member 63, and a pusher 64. The storage unit 60 is installed adjacent to the storage unit 40.

The first member 61 includes the space 65 (corresponding to the first space) in which the connection member 63 is movable in the state in which the connection member 63 is connected to the movable member 50. The second member 62 is disposed adjacent to the first member 61, and includes a space 66 in which the pusher 64 for applying a propulsive force to the connection member 63 is movable, and a hole 67 for circulating the air and discharging the leaked liquid agent. Note that the first member 61 and the second member 62 may be configured combined into a single component as long as it is possible to prepare the space in which the connection member 63 is movable, and the space in which the pusher 64 is movable.

As shown in FIG. 4, the connection member 63 includes a coupling part that is connected to the movable member 50, and a coupling part that can be coupled to the pusher 64. Like the connection member 23, in the present embodiment, the connection member 63 is configured as a columnar body, such as a hexagonal column or a cylindrical column. Note that a specific shape is not limited to the columnar body as long as the movable member 50 can be moved in the longitudinal direction (second direction Y) through the connection member 63.

The pusher 64 applies, through the connection member 63, a propulsive force for moving the movable member 50 in the longitudinal direction (second direction Y). Like the connection member 63, in the present embodiment, the pusher 64 is configured as a columnar body, such as a hexagonal column or a cylindrical column. Note that a specific shape is not limited to the columnar body as long as the movable member 50 can be moved in the second direction Y corresponding to the longitudinal direction through the connection member 63. As one example, like the storage unit 20, the storage unit 60 can be configured as an air piston.

(Dispensing Part 70)

The dispensing part 70 is configured to be capable of dispensing the material circulated from the third flow path 45 of the storage unit 40. A known nozzle can be attached to the dispensing part 70.

(Valves 80, 90)

The valves 80, 90 are configured to be capable of switching supplying and blocking of a fluid, such as the air, as power for driving the pushers 24, 64 of the storage units 20, 60. The valve 80 is configured in such a way as to allow supplying (circulating) the fluid, such as the air, to the space 26 in which the pusher 24 moves in the storage unit 20. The valve 90 is configured in such a way as to allow supplying (circulating) the fluid, such as the air, to the space 66 in which the pusher 64 moves in the storage unit 60. Note that the fluid supplied from the valves 80, 90 is not limited to the air, and may be composed of a fluid such as nitrogen as long as the fluid can apply a propulsive force to the pushers 24, 64.

(Circulation Control Method)

Figure 7:
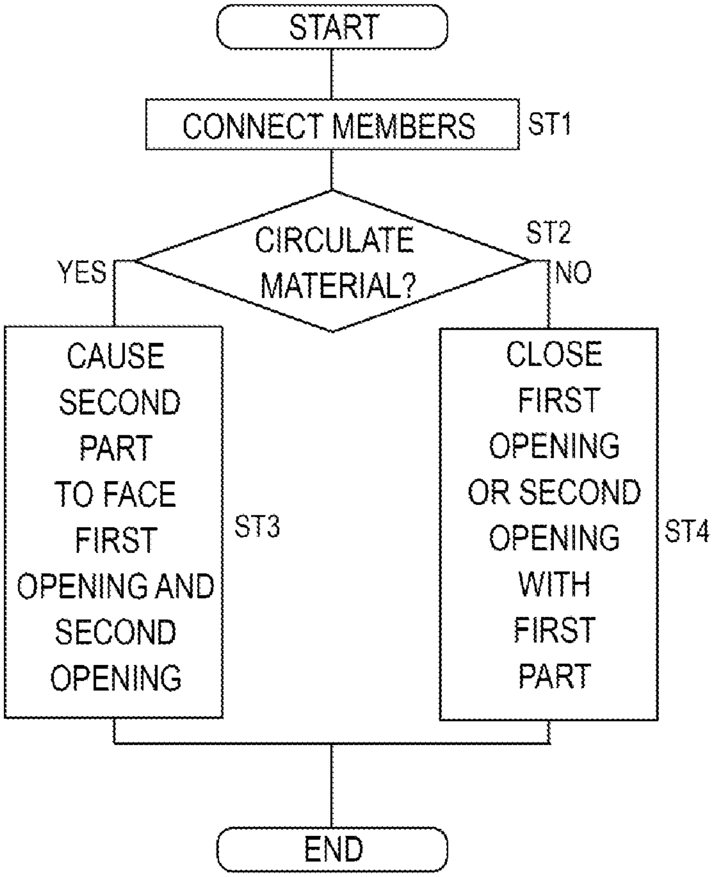
FIG. 7 is a flowchart showing a material circulation control method according to an embodiment of the present invention.

Next, a material circulation control method according to the present embodiment will be described. The material circulation control method according to the present embodiment will be described in brief with reference to FIG. 7. The second part 52 of the movable member 50 is caused to face the first opening 49*a* and the second opening 49*b* (ST3). Further, the first opening 49*a* or the second opening 49*b* is closed with the first part 51 of the movable member 50 (ST4). Detailed descriptions are given below.

First, in a state in which the dispensing apparatus 100 has not been assembled, components are mounted to assemble the dispensing apparatus 100 as shown in FIG. 4 (ST1). Here, the valves 80, 90 are connected to a fluid supply source (not shown). Further, the inlet 13*a* of the storage unit 10 is connected to the material supply source.

Next, if the material is going to be circulated from the dispensing apparatus 100 (ST2: YES), the material is supplied from the inlet 13*a*. In a state in which the needle valve 17 is not in contact with the valve seat 18, the material is circulated through the flow paths 13, 14, 15, 16 to the storage space 35. By moving the plunger 33 in a reciprocating manner in a state in which the plunger 33 is spaced apart from the sloping part 34, the material can be circulated from the storage space 35 to the dispensing part 70 through the first flow path 43, the second flow path 44, and the third flow path 45.

Moreover, for the circulation of the material, there is a case where the material is temporarily stored in the storage space 35 by controlling the circulation of the material in the storage unit 40.

Here, the case where the material is circulated from the upstream storage space 35 (ST2: YES) will be described. In this case, first, the needle valve 17 and the valve seat 18 are placed adjacent to each other so as to close the hole of the valve seat 18. In the state in which the hole of the valve seat 18 is closed, as shown in FIGS. 5 and 6, the movable member 50 is slidingly moved in the second direction Y so as to cause the second part 52 of the movable member 50 to face the first opening 49*a* of the first flow path 43 and the second flow path 44, and to face the second opening 49*b* of the second flow path 44 and the third flow path 35 (ST3). Here, the area of the cross-section of the second part 52 crossing the longitudinal direction is smaller than the area of a cross-section of the first part 51 crossing the longitudinal direction, and is smaller than the area of a cross-section orthogonal to the axis of the second flow path 44. Therefore, the material circulated from the first flow path 43 flows through the first opening 49*a* to the second flow path 44, and further passes through the second opening 49*b* and can circulate to the third flow path 45. Thus, it is possible to circulate the material from the first flow path 43 to the dispensing part 70. Note that "causing the second part 52 to face the first opening 49*a* and the second opening 49*b*" means bringing the second part 52 into a state in which the second part 52 faces (opposes) the first opening 49*a* and the second opening 49*b*, particularly, in a radial direction.

Next, a case where the circulation of the material is controlled in the storage unit 40, and the material from the upstream side is not circulated (ST2: NO) will be described. In this case, the movable member 50 is slidingly moved in the second direction Y so as to cause a left-side portion of the first part 51 relative to the second part 52 of the movable member 50 shown in FIG. 5 to close the second opening 49*b* of the second flow path 44 and the third flow path 45 (ST4). This operation also brings the first part 51 into contact with the packings 46, 47, 48. Therefore, the material circulated from the upstream storage space 35 is blocked by the first part 51 on the left side of the second part 52, and the circulation of the material to the third flow path 45 and the dispensing part 70 is blocked.

In the case where the circulation of the material is to be blocked in the dispensing apparatus 100 (ST2: NO), the storage space 35 can be used as a tank. In this case, by closing the second opening 49*b* with the first part 51 of the movable member 50, the material circulated from the flow path 13 can be temporarily stored in the storage space 35.

Stopping the supply of the material to the storage space 35 is performed by opening the valve 80, moving the pusher 24 and the connection member 23 in the longitudinal direction, and bringing the needle valve 17 into contact with the valve seat 18.

As described above, the dispensing apparatus 100 according to the present embodiment has the storage unit 40, and the movable member 50. The storage unit 40 includes the first flow path 43, the second flow path 44, and the third flow path 45. The first flow path 43 is capable of circulating the material, and extends in the first direction X. The second flow path 44 is configured to extend in the second direction Y crossing the first direction X, and communicate with the first flow path 43. The third flow path 45 is configured to be provided in parallel to the first direction X and communicates with the second flow path 44, and the axis of the third flow path 45 is spaced apart from that of the first flow path 43. The movable member 50 includes the first part 51, and the second part 52. The first part 51 is disposed so as to be movable in the second direction Y in the second flow path 44. The first part 51 closes at least one of the first opening 49*a* through which the first flow path 43 communicates with the second flow path 44, and the second opening 49*b* through which the second flow path 44 communicates with the third flow path 45, when the first part 51 is positioned on the extended line of the first flow path 43 or the third flow path 45. The second part 52 is provided continuously with the first part 51, and allows the first flow path 43 to be in communication with the second flow path 44, and also allows the second flow path 44 to be in communication with the third flow path 45 when the second part 52 is positioned on the extended line. The first part 51 and the second part 52 are formed in a long shape. The second part 52 is configured such that a cross-section thereof crossing the longitudinal direction is smaller than that of the first part 51.

In a case where the circulation of the material is controlled by a combination of a needle valve disposed immediately above a nozzle, and a valve seat, a flow path may be arranged along the longitudinal direction of the needle valve, and a hole of the valve seat for circulating the material may face the flow path. In such a specification in which the orientation of the hole of the valve seat substantially is aligned with the longitudinal direction of the flow path, when blocking the circulation of the material with the needle valve and the valve seat, there is a possibility that the material circulates relatively vigorously into the hole of the valve seat, and causes a change in the volume of the material on the downstream side. On the other hand, in the present embodiment, as described above, the first direction X in which the second opening 49*b* to be closed by the movable member 50 faces is configured to be different from the second direction Y in which the second flow path 44 extends. Thus, since the movable member 50 slidingly moves parallel to the second direction Y in which the second flow path 44 extends, it is possible to prevent or inhibit a change in the volume of the material that flows into the third flow path 45 when circulating the material from the second opening 49*b*. Consequently, it is possible to prevent or inhibit occurrence of a liquid pool of the material immediately above the dispensing part 70 corresponding to the nozzle, and precisely apply the material. Moreover, by configuring the second part 52 to be smaller than the first part 51, the space where the material is present in the second flow path 44 can be made relatively large. Hence, it is possible to easily distribute the material to around the second part 52, and prevent or inhibit occurrence of uneven wear of the second part 52.

Moreover, the movable member 50 is configured such that the longitudinal direction (second direction Y) of the first part 51 and the second part 52 extends in the horizontal direction in a state in which the dispensing apparatus 100 is installed. With such a configuration, the longitudinal direction of the movable member 50 is arranged to be different from the longitudinal direction (first direction X) of the needle valve 17 and the plunger 33, thereby inhibiting an increase in the size of the dispensing apparatus.

Further, the second part 52 is configured to be formed in a rod shape or a cylindrical shape. With such a configuration, it is possible to easily distribute the material circulated from the upstream side, to around the second part 52 in the cross-section crossing the longitudinal direction of the movable member 50. Consequently, it is possible to prevent or inhibit occurrence of uneven wear of the second part 52. In addition, it is possible to improve the sealing performance at the sealed portions of the packings 46 to 48.

In addition, the dispensing apparatus 100 includes the connection member 63 connectable to the movable member 50, and the storage unit 60 that is installed adjacent to the storage unit 40, and includes the space 65 in which the connection member 63 moves in the state in which the connection member 63 is connected to the movable member 50. Moreover, the dispensing apparatus 100 includes the packing 46 that is installed in the second flow path 44, and seals in such a manner as to separate the second flow path 44 and the space 65 in the state in which the connection member 63 is connected to the movable member 50. The packing 46 is configured in such a manner that a cross-section includes a bent-shaped portion. This makes it possible to prevent a leakage of the material, such as liquid, from the second flow path 44 to the space 65.

Further, the dispensing apparatus 100 includes the packing 47. The packing 47 is installed in the second flow path 44, at the boundary between the first part 51 and the second part 52 in the longitudinal direction, when the first part 51 closes at least one of the first opening 49*a* and the second opening 49*b* in the second flow path 44. By configuring the packing 47 in such a manner, it is possible to prevent the material from unintentionally circulating from the first flow path 43 to the third flow path 45 when the first part 51 closes at least one of the first opening 49*a* and the second opening 49*b*.

Furthermore, the dispensing apparatus 100 includes the storage unit 30, and the plunger 33 movably installed in the storage unit 30. The storage unit 30 is installed adjacent to the storage unit 40, and includes the storage space 35 provided upstream of the first flow path 43. The plunger 33 is movably installed in the storage space 35, and is configured to be capable of pushing the material stored in the storage space 35 toward the first flow path 43 with the reciprocating movement. With such a configuration, the material stored in the storage space 35 can be quantitatively fed by pressure into the first flow path 43.

In addition, the dispensing apparatus 100 includes the storage unit 10, and the needle valve 17 and the valve seat 18 installed in the storage unit 10. The storage unit 10 is disposed adjacent to the storage unit 30, and is arranged upstream of the storage space 35. The needle valve 17 is installed so as to be movable in a reciprocating manner in the flow path 15. The valve seat 18 is installed on the upstream side relative to the needle valve 17 in the flow path 15, and blocks the circulation of the material in the flow path 15 by making contact with the needle valve 17. With such a configuration, storing the material in the storage space 35 can be switched between on and off. Further, with the use of the needle valve 17 and the valve seat 18 to open and close the liquid supply of the material from the flow path 13, it is possible to block the circulation of the material even when the pressure resistance is relatively high.

In the material circulation control method according to the present embodiment, the circulation of the material from the first flow path 43 is blocked by placing the movable member 50 such that the first part 51 of the movable member 50 closes at least one of the first opening 49*a* and the second opening 49*b*. Moreover, by placing the movable member 50 such that the second part 52 faces the first opening 49*a* and the second opening 49*b*, the material from the first flow path 43 is caused to circulate through the second flow path 44 to the third flow path 45. With such a configuration, it is possible to prevent or inhibit occurrence of a change of the volume of the material when, immediately above the dispensing part 70 corresponding to the nozzle, the material circulated from the second opening 49*b* flows into the third flow path 45. Therefore, it is possible to prevent or inhibit a liquid pool of the material, and precisely apply the material.

Note that the present invention is not limited to only the above-described embodiments, and various modifications are possible within the scope of the patent claims. The embodiment in which the installation member 12 of the storage unit 10 and the formation member 41 of the storage unit 40 are integral has been described above. However, this is not a limitation, and both of these members may be configured as different bodies (different components). Further, the embodiment in which the circulation of the material is blocked by closing the second opening 49*b* with the left-side portion of the first part 51 relative to the second part 52 of the movable member 50 (see FIG. 5) has been described above. However, this is not a limitation, and the first opening 49*a* of the first flow path 43 and the second flow path 44 may be configured to be closed by the right-side portion relative to the second part 52 of the movable member 50. With such a configuration, it is also possible to prevent or inhibit a liquid pool of the material, and precisely apply the material. Furthermore, although it has been described above that the storage units 20, 60 can be configured like air pistons, this is not a limitation, and the storage units 20, 60 may be configured like motors.

Note that the present application is based on Japanese Patent Application No. 2019-184532 filed on Oct. 7, 2019, and the disclosure of which is incorporated herein by reference in its entirety.

REFERENCE SIGNS LIST

- 100 Dispensing apparatus
- 10 Storage unit (fourth storage unit)
- 11 Inlet member
- 12 Installation member,
- 13-16 Flow path (fifth flow path)
- 17 Needle valve
- 18 Valve seat
- 30 Storage unit (third storage unit)
- 31 Closing member
- 32 Reservoir member
- 33 Plunger
- 35 Storage space (fourth flow path)
- 40 Storage unit (first storage unit)
- 41 Formation member
- 42 Attachment member
- 43 First flow path
- 44 Second flow path
- 45 Third flow path
- 46 Packing (first seal member)
- 47 Packing (second seal member)
- 49*a* First opening
- 49*b* Second opening
- 50 Movable member
- 51 First part
- 52 Second part
- 60 Storage unit (second storage unit)
- 63 Connection member
- 65 Space (first space)
- X First direction
- Y Second direction (longitudinal direction)

The invention claimed is:

1. A dispensing apparatus comprising:

a first storage unit including a first flow path that is capable of circulating a material, a second flow path that crosses the first flow path, wherein the first flow path leads to the second flow path, and a third flow path that is provided parallel to the first flow path, wherein the second flow path leads to the third flow path, and the third flow path is parallelly apart from the first flow path;

a movable member disposed so as to be movable in the second flow path, the movable member including right and left first parts and a second part, the second part being disposed between the right and left first parts, the movable member being movable such that the left first part is capable of disconnecting the second flow path and the third flow path, the second part being provided continuously with the right and left first parts, and the movable member being movable such that the second part is capable of connecting the first flow path and the second flow path and connecting the second flow path and the third flow path;

a connection member connectable to the movable member;

a second storage unit that is installed adjacent to the first storage unit, and includes a first space in which the connection member moves in a state in which the connection member is connected to the movable member; and a first seal member that is installed outside of the second flow path, and seals so as to separate the second flow path and the first space by touching the left first part in the state in which the connection member is connected to the movable member, wherein the first flow path is connected to the second flow path via a first opening, the second flow path is connected to the third flow path via a second opening, the right and left first parts and the second part are formed in a long shape, the second part is formed such that the second part is smaller than each of the left and right first parts in a cross section along a longitudinal plane crossing through the second part and each of the right and left first parts, the first seal member includes a portion with a cross-section formed in a bent shape, and the dispensing apparatus further comprises a second seal member that is disposed in a wall of the second flow path to abut on an outer surface of the left first part when the left first part closes the second opening in the second flow path, and the second seal member does not abut on the outer surface of the left first part when the left first part opens the second opening in the second flow path.

2. The dispensing apparatus according to claim 1, wherein the movable member moves along the longitudinal direction of the movable member.

3. The dispensing apparatus according to claim 1, wherein the second part is formed in a rod shape or a cylindrical shape.

4. The dispensing apparatus according to claim 1, further comprising:

a third storage unit that is installed adjacent to the first storage unit, and includes a fourth flow path provided upstream of the first flow path; and a plunger that is installed so as to be movable in a reciprocating manner in the fourth flow path, and is capable of pushing the material stored in the fourth flow path toward the first flow path with a reciprocating movement.

5. The dispensing apparatus according to claim 4, further comprising:

a fourth storage unit that is installed adjacent to the third storage unit, and includes a fifth flow path provided upstream of the fourth flow path;

a needle valve installed so as to be movable in a reciprocating manner in the fifth flow path; and a valve seat that is installed upstream of the needle valve in the fifth flow path, and blocks circulation of the material in the fifth flow path by making contact with the needle valve.

6. The dispensing apparatus according to claim 1, wherein the second opening is located between the first seal member and the second seal member.

* * * * *